United States Patent
Nishimura et al.

(10) Patent No.: US 11,152,135 B2
(45) Date of Patent: Oct. 19, 2021

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Haruka Nakano, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/056,942

(22) PCT Filed: Feb. 25, 2019

(86) PCT No.: PCT/JP2019/007017
§ 371 (c)(1),
(2) Date: Nov. 19, 2020

(87) PCT Pub. No.: WO2019/230081
PCT Pub. Date: Dec. 5, 2019

(65) Prior Publication Data
US 2021/0210250 A1    Jul. 8, 2021

(30) Foreign Application Priority Data
May 30, 2018 (JP) .............................. JP2018-103257

(51) Int. Cl.
*H01B 7/08* (2006.01)
*B60R 16/02* (2006.01)

(52) U.S. Cl.
CPC ......... *H01B 7/0846* (2013.01); *H01B 7/0838* (2013.01); *B60R 16/0215* (2013.01)

(58) Field of Classification Search
CPC .... H01B 7/0846; H01B 7/0838; H01B 7/083; H01B 7/08; B60R 16/0215; B60R 16/0207; H05K 1/118
See application file for complete search history.

(56) References Cited

U.S. PATENT DOCUMENTS

| 3,733,428 A * | 5/1973 | Fry ...................... | H01B 7/0846 174/72 A |
| 4,678,864 A * | 7/1987 | Cox ..................... | H01B 7/0823 156/289 |
| 2020/0112115 A1* | 4/2020 | Vana, Jr. ............... | H01B 7/295 |

FOREIGN PATENT DOCUMENTS

JP       49-47885 A       5/1974
JP       58-168010 U      11/1983
(Continued)

OTHER PUBLICATIONS

International Search Report, WIPO, Application No. PCT/JP2019/007017, dated Apr. 9, 2019, with English translation.
(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A wiring member includes a sheet material and a plurality of insulating wires disposed to have a crossing part on a main surface of the sheet material. For example, an insulating covering of a lower wiring part in the crossing part is fixed to the sheet material in a position of the crossing part, and (Continued)

a thickness of at least one of the insulating covering of the lower wiring part and the sheet material in the position is reduced.

13 Claims, 2 Drawing Sheets

(56) References Cited

FOREIGN PATENT DOCUMENTS

| JP | 62-256492 A | 11/1987 |
|----|----|----|
| JP | 2002-325323 A | 11/2002 |
| JP | 2004-342394 A | 12/2004 |
| JP | 2014-11910 A | 1/2014 |

OTHER PUBLICATIONS

Written Opinion of the International Searching Authority, WIPO, International Application No. PCT/JP2019/007017, dated Apr. 9, 2019.
Notification of Reasons for Refusal, Japanese Patent Office, Application No. 2018-103257, dated Aug. 6, 2019, with English translation.
International Preliminary Report on Patentability, WIPO, Application No. PCT/JP2019/007017, dated Jan. 24, 2020, with English translation.

\* cited by examiner

WIRING MEMBER

TECHNICAL FIELD

The present disclosure relates to a wiring member.

BACKGROUND ART

There is a flexible flat cable (FFC) or a flexible printed circuit (FPC) as a wiring member flatly formed for connecting an electrical component mounted to a vehicle (for example, refer to Patent Document 1).

PRIOR ART DOCUMENTS

Patent Documents

Patent Document 1: Japanese Patent Application Laid-Open No, 2014-11910

SUMMARY

Problem to be Solved by the Invention

However, in the above FFC and FPC, it is hard to cross conductors with each other without a short-circuit in one wiring member. Thus, a wiring route of the conductor in one wiring member is limited.

Accordingly, an object of the present invention is to provide a technique capable of increasing a degree of freedom of a wiring route of a conductor in a flat wiring member.

Means to Solve the Problem

A wiring member according to the present disclosure is a wiring member including a sheet material and a plurality of insulating wires disposed to have a crossing part on a main surface of the sheet material.

Effects of the Invention

According to the present disclosure, a degree of freedom of a wiring route of a conductor can be increased in a flat wiring member.

DESCRIPTION OF EMBODIMENT(S)

Description of Embodiment of Present Disclosure

Figure 1:
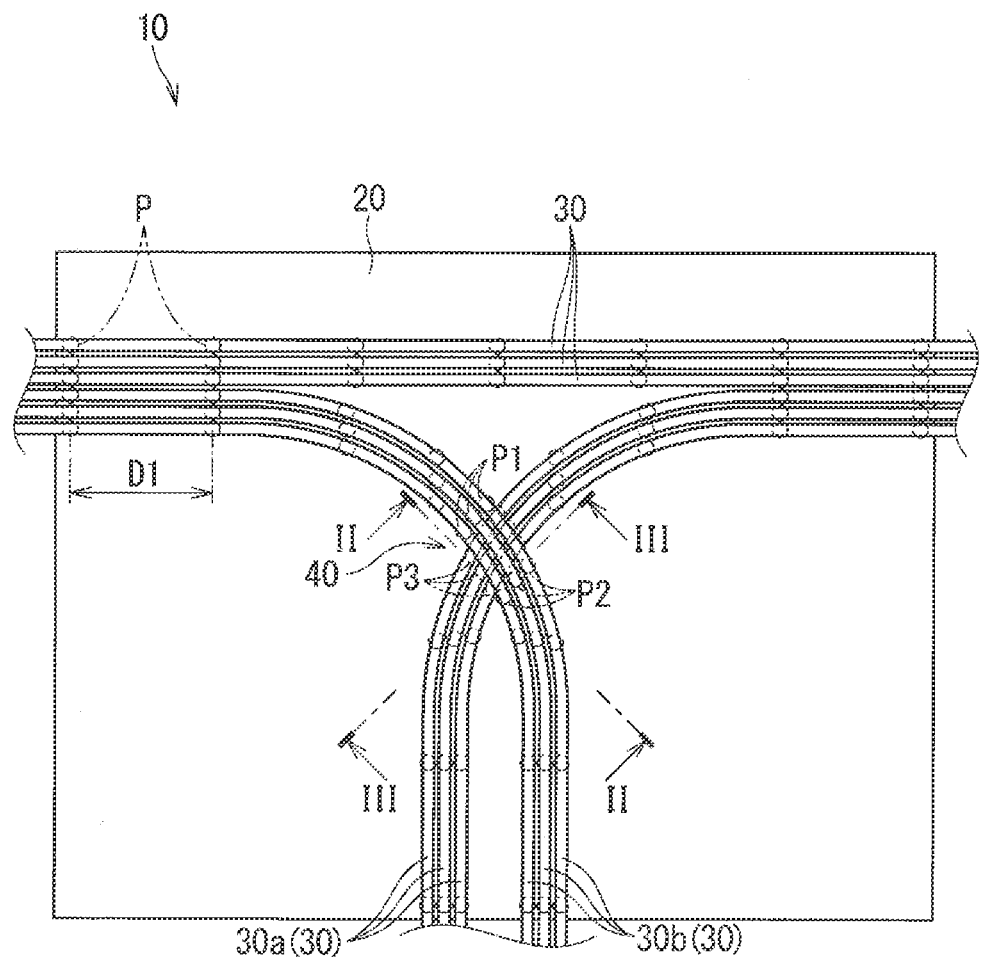
FIG. 1 is a plan view illustrating a wiring member according to an embodiment.

Embodiments of the present disclosure are listed and described firstly.

A wiring member according to the present disclosure is as follows.

(1) A wiring member according to the present disclosure is a wiring member including a sheet material and a plurality of insulating wires disposed to have a crossing part on a main surface of the sheet material.

The insulating wires are crossed on the sheet material, thus a degree of freedom of a wiring route of a conductor can be increased in a flat wiring member.

(2) It is preferable that an insulating covering of a lower wiring part in the crossing part is fixed to the sheet material in a position of the crossing part, and a thickness of at least one of the insulating covering of the lower wiring part and the sheet material in this fixing part is reduced. The reason is that a height of the crossing part can be reduced, thus increase in a thickness of the wiring member can be suppressed.

(3) The insulating wire constituting an upper wiring part in the crossing part is preferably fixed to the sheet material in a first position and a second position sandwiching the crossing part. The reason is that the upper wiring part hardly leaves the sheet material even when the wiring member is bent.

(4) An interval between the first position and the second position is preferably equal to or smaller than 30 millimeters. The reason is that the upper wiring part further hardly leaves the sheet material even when the wiring member is bent, and an amount of the upper wiring part leaving the sheet material can be reduced.

(5) The interval between the first position and the second position is preferably equal to or smaller than 20 millimeters. The reason is that the upper wiring part particularly hardly leaves the sheet material even when the wiring member is bent, and an amount of the upper wiring part leaving the sheet material can be further reduced.

(6) Each of intervals between the first position and the crossing part and between the second position and the crossing part is preferably equal to or larger than a minimum bending radius of the insulating wire constituting the upper wiring part. The reason is that the upper wiring part bending before and after the crossing part is hardly damaged.

(7) The insulating wire constituting the upper wiring part is preferably fixed to the sheet material also in a position other than the first position and the second position with an interval different from an interval between the first position and the second position along a longitudinal direction. The fixing can be performed in accordance with an arrangement form of the insulating wire.

(8) A part of the insulating wire constituting the crossing part is preferably flat. The reason is that the height of the crossing part can be reduced.

(9) A part of the insulating wire other than the crossing part preferably includes a part not flatter than the part constituting the crossing part. The reason is that the height of the crossing part can be reduced even in a case where a general-purpose wire such as a round wire, for example, is used as an electrical wire.

Details of Embodiment of Present Disclosure

Specific examples of a wiring member of the present disclosure are described hereinafter with reference to the drawings. The present invention is not limited to these examples, but is indicated by claims, and it is intended that meanings equivalent to claims and all modifications within a scope of claims are included.

[Embodiment] A wiring member according to an embodiment is described hereinafter. FIG. 1 is a plan view illustrating a wiring member 10 according to the embodiment.

Figure 2:
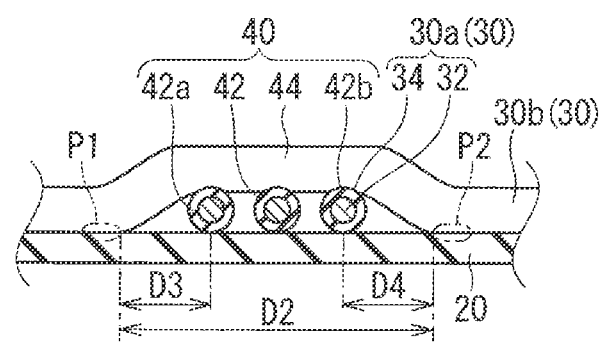
FIG. 2 is a schematic cross-sectional view of the wiring member cut along a II-II line in FIG. 1.
Figure 3:
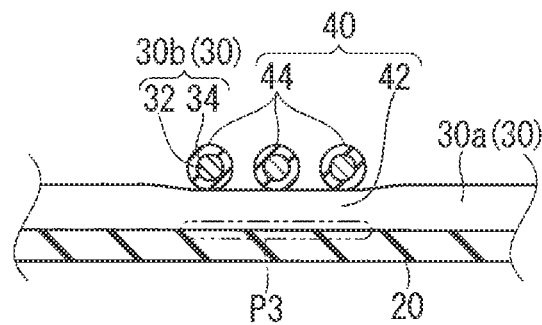
FIG. 3 is a schematic cross-sectional view of the wiring member cut along a III-III line in FIG. 1.

FIG. 2 is a schematic cross-sectional view of the wiring member 10 cut along a II-II line in FIG. 1. FIG. 3 is a schematic cross-sectional view of the wiring member 10 cut along a III-III line in FIG. 1.

The wiring member 10 is a member connecting electrical components mounted to a vehicle. The wiring member 10 is flatly formed. The wiring member 10 includes a sheet material 20 and a plurality of insulating wires 30.

The sheet material 20 keeps the plurality of insulating wires 30 in a flat state. A material constituting the sheet material 20 is not particularly limited, however, the sheet material 20 is preferably formed of a material containing a resin of polyvinyl chloride (PVC), polyethylene terephthalate (PET), or polypropylene (PP). The sheet material 20 may contain a material such as a metal, for example. The sheet material 20 preferably has flexibility. The sheet material 20 may be a single layer or may be a plurality of stacked layers. When the sheet material 20 is the plurality of stacked layers, it is considered that a resin layer and a resin layer are stacked, for example. It is also considered that a resin layer and a metal layer are stacked, for example. It is also considered that a metal layer and a metal layer are stacked, for example.

In the example illustrated in FIG. 1, the sheet material 20 is formed to have a quadrangular shape, however, the shape of the sheet material 20 is not limited thereto. The sheet material 20 may be formed to have a shape corresponding to an arrangement route f the insulating wire 30, for example. A part where the insulating wire 30 is not disposed can be appropriately omitted. For example, it is also considered that the part where the insulating wire 30 is not disposed is omitted in the example illustrated in FIG. 1 and the sheet material 20 is formed into a T-shape. It is also considered that marking is performed on the part of the sheet material 20 where the insulating wire 30 is not disposed, more specifically, an empty part of a wire arrangement surface or a surface of the sheet material 20 opposite from the wire arrangement surface. A shape of the marking is not particularly limited, however, a character, a barcode, or a QR code (registered trademark), for example, is also applicable. Information included in the marking is not particularly limited, however, various types of information relating to the wiring member 10 such as a manufacturing number, a name of terminal, and a Part number, for example, are considered to be included. A means of marking is not particularly limited, however, various types of means such as printing or a marking formed into a convex-concave shape can be adopted. A component or type of the sheet material 20 may be classified depending on a difference of color thereof, for example.

The insulating wire 30 is a member connecting electrical components mounted to a vehicle. The insulating wire 30 is used as a power line supplying a power source or a signal line transmitting a signal, for example. All of the insulating wires 30 disposed on the sheet material 20 may be used as power lines or signal lines. Both the insulating wire 30 used as the power line and the insulating wire 30 used as the signal line may be provided and disposed together on the sheet material 20.

Specifically, each insulating wire 30 includes a core wire 32 and an insulating covering 34 for covering the core wire 32. The core wire 32 is made up of one or a plurality of strands. The strand is formed of a conductor made of copper, copper alloy, aluminum, or aluminum alloy, for example. When the core wire 32 is made up of the plurality of strands, the plurality of strands are preferably stranded. The insulating covering 34 is formed by extrusion molding of a resin material such as PVC or polyethylene (PE) around the core wire 32 or applying a resin coating of enamel, for example, around the core wire 32.

The insulating wire 30 may be a general wire, a shield wire, a twisted wire, or an antenna wire, for example. The insulating wire 30 may be a single wire or a combined wire (a cable made up of a compound body covered by a sheath). In the description hereinafter, the insulating wire 30 is a general wire which is a so-called round wire having a round shape in cross-section.

The insulating wire 30 is connected to an electrical component mounted to a vehicle via a terminal and a connector provided on an end portion of the insulating wire 30, for example. In the example illustrated in FIG. 1, the end portion of the insulating wire 30 extends outside from the sheet material 20, however, there may also be a case where the end portion of the insulating wire 30 is disposed on the sheet material 20.

The plurality of insulating wires 30 are disposed to have a crossing part 40 on a main surface of the sheet material 20. In the description hereinafter, the insulating wire 30 located on a lower side of the crossing part 40 is referred to as a lower wiring part 42, and the insulating wire 30 located on an upper side is referred to as an upper wiring part 44. The insulating wire 30 forming the lower wiring part 42 is referred to as an insulating wire 30a, and the insulating wire 30 forming the upper wiring part 44 is referred to as an insulating wire 30b in some cases. The lower wiring part 42 is the insulating wire 30 located on a side closest to the sheet material 20 in the crossing part 40. The lower wiring part 42 normally has contact with the sheet material 20. The upper wiring part 44 is the insulating wire 30 overlapped with the lower wiring part 42 on a side opposite from the sheet material 20 in the crossing part 40. The upper wiring part 44 normally has contact with the lower wiring part 42.

Herein, the number of lower wiring parts 42 in one crossing part 40 may be one, or a plurality of lower wiring parts 42 may also be adopted. Similarly, the number of upper wiring parts 44 in one crossing part 40 may be one, or a plurality of upper wiring parts 44 may also be adopted. The number of upper wiring parts 44 and the number of lower wiring parts 42 in one crossing part 40 may be the same or different from each other. The example illustrated in FIG. 1 shows a case where the number of upper wiring parts 44 and the number of lower wiring parts 42 in one crossing part 40 are both three. Thus, the three upper wiring parts 44 cross over one lower wiring part 42 in one crossing part 40. One upper wiring part 44 crosses over the three lower wiring parts 42 in one crossing part 40.

The plurality of insulating wires 30 are fixed on the main surface of the sheet material 20. Applicable as the above fixing state are a contact area fixation and a non-contact area fixation, or both fixations may be used together. Herein, the contact area fixation indicates that a portion where the insulating wire 30 and the sheet material 20 have contact with each other is stuck and fixed. The non-contact area fixation is a fixing state which is not the contact area fixation, and indicates that a sewing thread, the other sheet material, or an adhesive tape presses the insulating wire 30 toward the sheet material 20 or sandwiches the insulating wire 30 and the sheet material 20 to keep them in a fixing state. In the description hereinafter, the insulating wire 30 and the sheet material 20 are in the state of the contact area fixation.

Applicable as the configuration of the contact area fixation are a contact area indirect fixation and a contact area direct fixation, or both fixations may also be used together in different regions. Herein, the contact area indirect fixation indicates that the insulating wire 30 and the sheet material 20 are indirectly stuck and fixed via an adhesive agent, a gluing agent, and a double-sided adhesive tape provided therebetween. The contact area direct fixation indicates that the insulating wire 30 and the sheet material 20 are directly stuck and fixed without an intervention of the adhesive agent, for example, which is separately provided. Considered in the contact area direct fixation is that resin included in at least one of the insulating wire 30 and the sheet material 20 is melted, thus the insulating wire 30 and the sheet material 20 are stuck and fixed, for example. In the description hereinafter, the insulating wire 30 and the sheet material 20 are in the state of the contact area direct fixation.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the insulating wire 30 and the sheet material 20 are in the state of the contact area direct fixation by these means. Specifically, when the state of the contact area direct fixation is formed by the ultrasonic welding, for example, the insulating wire 30 and the sheet material 20 are in the state of the contact area direct fixation by the ultrasonic welding. In the description hereinafter, the insulating covering 34 and the sheet material 20 are in the state of the contact area direct fixation by the ultrasonic welding.

In the case of the contact area direct fixation, only one of the resin included in the insulating covering 34 of the insulating wire 30 and the resin included in the sheet material 20 may be melted, or both of them may be melted. In the former case, the resin which has been melted is stuck on an outer surface of the resin which has not been melted, and a relatively clear interface may be formed in some cases. In the latter case, there may be a case where both the resins are mixed and a clear interface is not formed. Particularly, when the insulating covering 34 of the insulating wire 30 and the sheet material 20 include compatible resin such as the same resin material, for example, there may be a case where both the resins are mixed and a clear interface is not be formed.

The insulating wire 30 is fixed (welded herein) to the sheet material 20 in a plurality of positions at intervals in a longitudinal direction. In the example illustrated in FIG. 1, a fixing position P is shown by a virtual line. However, the insulating wire 30 may be sequentially fixed to the sheet material 20 in the longitudinal direction.

The insulating wire 30b constituting the upper wiring part 44 is fixed (welded herein) to the sheet material 20 in a first position P1 and a second position P2 sandwiching the crossing part 40. The insulating wire 30b is also fixed (welded herein) to the sheet material 20 in positions other than the first position P1 and the second position P2. An interval of the positions where the insulating wire 30b is fixed to the sheet material 20 other than the first position P1 and the second position P2 is referred to as a first interval D1 hereinafter. An interval between the first position P1 and the second position P2 is referred to as a second interval D2.

The first interval D1 and the second interval D2 are not particularly limited. When the first interval D1 and the second interval D2 are set relatively small, the insulating wire 30 is more firmly fixed to the sheet material 20, and the insulating wire 30 hardly leaves the sheet material 20 in an area between the fixing positions when the wiring member 10 is bent. In contrast, when the first interval D1 and the second interval D2 are set relatively large, a time taken to fix the insulating wire 30 to the sheet material 20 can be reduced. Accordingly, the first interval D1 and the second interval D2 may be appropriately set in view of those states.

The first interval D1 is basically constant herein. Herein, the first interval D1 is the same as an interval of positions Where the insulating wire 30 and the sheet material 20, which do not form the crossing part 40, are fixed.

The second interval D2 is different from the first interval D1 herein. Particularly, the second interval D2 is smaller than the first interval D1 herein. For example, the second interval D2 is preferably equal to or smaller than 30 millimeters. Furthermore, for example, it is further preferable that the second interval D2 is equal to or smaller than 20 millimeters.

The second interval D2 is smaller than the first interval D1 by reason that the part, which is to be the upper wiring part 44, of the insulating wire 30b leaves the sheet material 20 at the area between the fixing positions more easily than the part where the crossing part 40 is not formed when the wiring member 10 is bent. More specifically, the insulating wire 30b is bent in a direction away from the sheet material 20 in the part crossing over the lower wiring part 42 between the first position P1 and the second position P2, Thus, when the wiring member 10 is bent so that the wire arrangement surface faces inside, the insulating wire 30b easily bends in a direction of leaving the sheet material 20 between the first position P1 and the second position P2, and easily leaves the lower wiring part 42. In contrast, the part of the insulating wire 30b where the crossing part 40 is not formed extends along the sheet material 20. Thus, the part of the insulating wire 30b where the crossing part 40 is not formed can bend to follow a bending direction of the sheet material 20 when the wiring member 10 is bent so that the wire arrangement surface faces inside, thereby hardly leaving the sheet material 20.

Herein, the bending of the wiring member 10 described above may occur when the wiring member 10 is assembled to a vehicle, for example. When the insulating wire 30 leaves the sheet material 20 due to the bending of the wiring member 10 in a case where the wiring member 10 is assembled to the vehicle, there is a possibility that the leaving part is caught on a surrounding member and damaged, or the insulating wire 30 comes out of the sheet material 20. Particularly, the position where the flat wiring member 10 is assembled is a narrow position in many cases, thus the insulating wire 30 may be caught on the surrounding member even when it leaves the sheet material 20 just a little. In contrast, herein, the second interval D2 is made smaller than the first interval D1, thus the insulating wire 30b hardly leaves the sheet material 20 even in the part between the first position P1 and the second position P2, and these states hardly occur.

An interval between the first position P1 and the crossing part 40 is referred to as a third interval D3. An interval between the second position P2 and the crossing part 40 is referred to as a fourth interval D4. Herein, the third interval D3 is considered an interval between the lower wiring part 42a located on a side closest to the first position P1 in the lower wiring part 42 and the first position P1, for example. Similarly, the fourth interval D4 is considered an interval between the lower wiring part 42b located on a side closest to the second position P2 in the lower wiring part 42 and the second position P2, for example. Each of the third interval D3 and the fourth interval D4 are set to equal to or larger than a minimum bending radius (also referred to as a minimum flexion radius or an allowable bending radius, for example) of the insulating wire 30b constituting the upper wiring part 44.

Herein, the minimum bending radius indicates a value that the insulating wire 30 is recommended to be bent with a radius exceeding the value when the insulating wire 30 is bent and disposed. More specifically, when the insulating wire 30 is bent, a difference in perimeter occurs between an inner peripheral side and an outer peripheral side, and thus compression force is applied to the inner peripheral side and extension force is applied to the outer peripheral side. When the bending radius of the insulating wire 30 is reduced, this force generally increases. When this force increases, there is a possibility that the insulating wire 30 is buckled or disconnected. Thus, the minimum bending radius is set for the insulating wire 30 to prevent exceeding increase in this force.

The minimum bending radius is a value appropriately set in accordance with a material, a shape, and an arrangement state (a fixing state or a movable state, for example) of the insulating wire 30, for example. The minimum bending radius is a value normally set for each type of the insulating wire 30. The minimum bending radius is normally set several times as large as a diameter of the insulating wire 30 in many cases.

Each of the third interval D3 and the fourth interval D4 is set to equal to or larger than the minimum bending radius of the insulating wire 30b constituting the upper wiring part 44, thus it can be suppressed that the insulating wire 30b constituting the upper wiring part 44 is bent with a radius smaller than the minimum bending radius. Accordingly, a damage or a disconnection of the insulating wire 30b can be suppressed.

The insulating covering 34 of the insulating wire 30a constituting the lower wiring part 42 is fixed to the sheet material 20 in a position P3 of the crossing part 40. At this time, a thickness of at least one of the insulating covering 34 of the insulating wire 30a constituting the lower wiring part 42 and the sheet material 20 in the fixing part is smaller than that of the surrounding part. Herein, the insulating covering 34 of the insulating wire 30a constituting the lower wiring part 42 and the sheet material 20 are welded in the position P3 of the crossing part 40, thus the thickness of at least one of insulating covering 34 of the insulating wire 30a constituting the lower wiring part 42 and the sheet material 20 in the bonding part is reduced. Accordingly, a sum of the thickness of the insulating covering 34 of the lower wiring part 42 and the sheet material 20 is smaller than that before welding. Herein, the three upper wiring parts 44 cross over one lower wiring part 42 in one crossing part 40. In this manner, when the plurality of upper wiring parts 44 cross over one lower wiring part 42 in one crossing part 40, it is sufficient that the insulating covering 34 in each part overlapping with the plurality of upper wiring parts 44 in one lower wiring part 42 is welded to the sheet material 20.

Herein, the insulating covering 34 of the lower wiring part 42 is welded to the sheet material 20 over the whole crossing part 40 in one crossing part 40. That is to say, the insulating covering 34 in the area between the parts overlapping with the plurality of upper wiring parts 44 is welded to the sheet material 20 in addition to each part of one lower wiring part 42 overlapping with the plurality of upper wiring parts 44 in one crossing part 40. However, there is also a case where the insulating covering 34 in the area between the parts overlapping with the plurality of upper wiring parts 44 in one lower wiring part 42 is not welded to the sheet material 20 in one crossing part 40.

According to the wiring member 10 having the configuration described above, the insulating wires 30 are crossed on the sheet material 20, thus a degree of freedom of a wiring route of a conductor can be increased in one flat wiring member 10.

The insulating covering 34 of the insulating wire 30a constituting the lower wiring part 42 is welded to the sheet material 20 in the position of the crossing part 40, thus the height of the crossing part 40 can be reduced, and the increase in the thickness of the wiring member 10 can be suppressed.

The insulating wire 30b constituting the upper wiring part 44 is fixed to the sheet material 20 in each of the first position P1 and the second position P2 sandwiching the crossing part 40, thus the upper wiring part 44 hardly leaves the sheet material 70 even when the wiring member 10 is bent. At this time, when the second interval D2 between the first position P1 and the second position P2 is equal to or smaller than 30 millimeters, the upper wiring part 44 hardly leaves the sheet material 20 even when the wiring member 10 is bent, and an amount of the upper wiring part 44 leaving the sheet material 20 can be reduced. Particularly, when the second interval D2 between the first position P1 and the second position P2 is equal to or smaller than 20 millimeters, the upper wiring part 44 particularly hardly leaves the sheet material 20 even when the wiring member 10 is bent, and the amount of the upper wiring part 44 leaving the sheet material 20 can be further reduced.

Each of the third interval D3 between the first position P1 and the crossing part 40 and the fourth interval D4 between the second position P2 and the crossing part 40 is equal to or larger than the minimum bending radius of the insulating wire 30b constituting the upper wiring part 44, thus suppressed is the bending of the insulating wire 30b with a bending radius smaller than the minimum bending radius, and the upper wiring part 44 bending before and after the crossing part 40 is hardly damaged.

The insulating wire 30b constituting the upper wiring part 44 is fixed to the sheet material 20 also in the positions other than the first position P1 and the second position P2, with the first interval D1 different from the second interval D2 between the first position P1 and the second position P2 along the longitudinal direction thus the insulating wire 30 can be fixed in accordance with the arrangement form of the insulating wire 30.

The plurality of insulating wires 30 are positioned on the sheet material 20, thus a circuit can be identified even when the circuit is not classified by colors depending on the circuit but has a single color. It is obvious that the plurality of insulating wires 30 may be classified by colors depending on the circuit.

Modification Example

Figure 4:
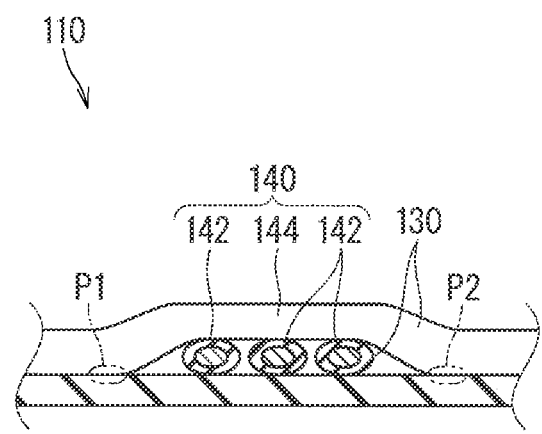
FIG. 4 is a schematic cross-sectional view illustrating a wiring member according to a modification example.
Figure 5:
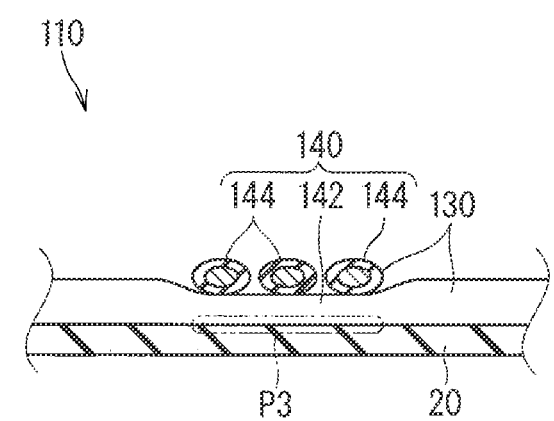
FIG. 5 is a schematic cross-sectional view illustrating a wiring member according to a modification example.

FIG. 4 and FIG. 5 are schematic cross-sectional views each illustrating a wiring member 110 according to a modification example. FIG. 4 is a schematic cross-sectional view in a position corresponding to FIG. 2. FIG. 5 is a schematic cross-sectional view in a position corresponding to FIG. 3.

In the wiring member 110 according to the modification example, a part of the insulating wire 130 constituting a crossing part 140 is flat. In this manner, the part of the insulating wire 130 constituting the crossing part 140 is flat, thus a height of the crossing part 140 can be reduced. In this case, both an upper wiring part 144 and a lower wiring part 142 are flat herein, however, this configuration is not necessary. In the upper wiring part 144 and the lower wiring part 142, only the upper wiring part 144 may be flatly formed, or only the lower wiring part 142 may be flatly formed. However, when both the upper wiring part 144 and the lower wiring part 142 are flatly formed, the height of the crossing part 140 can be further reduced compared with the case where only one of them is flatly formed.

In the wiring member 110, there is a part which is not flatter than the part constituting the crossing part 140 in a part of the insulating wire 130 other than the crossing part 140. More specifically, a round wire is used as the insulating wire 130 also in the wiring member 110 in the manner similar to the embodiment. A part of the round wire which is to be the crossing part 140 is pressed and crushed, thus the part which is to be the crossing part 140 is flattened. At this time, there is a part where the round wire is not crushed or is crushed in small amount in a part other than the crossing part 140, thus there is a part which is not flatter than the part constituting the crossing part 140 in the part of the insulating wire 130 other than the crossing part 140. For example, in the part of the insulating wire 130, which has the part constituting the crossing part 140, disposed on the sheet material 20, the part which does not constitute the crossing part 140 and is not fixed to the sheet material 20 may become the part where the round wire is not crushed or is crushed in small amount.

When the insulating wire 130 is crushed, the insulating wire 130 is considered to be pressed with heat. The upper wiring part 144 and the lower wiring part 142 overlapped with each other are considered to be pressed and crushed. When these conditions are simultaneously satisfied, a heating temperature is preferably low. The reason is that if the heating temperature is low, there is a possibility that the insulating covering 34 flows, and the upper wiring part 144 and the lower wiring part 142 are short-circuited.

In this manner, when there is the part which is not flatter than the part constituting the crossing part 140 in the part of the insulating wire 130 other than the crossing part 140, even in a case where a general-purpose wire such as a round wire, for example, is used as the insulating wire 130, a part constituting the crossing part 140 is crushed and flattened, thus the height of the crossing part 140 can be reduced.

Particularly herein, the part of the insulating wire 130 constituting the crossing part 140 is flatter than the part other than the crossing part 140. That is to say, the part of the insulating wire 130 constituting the crossing part 140 is a part crushed the most. Accordingly, the height of the crossing part 140 can be further reduced. An end portion of the insulating wire 130 is flattened to be connected to a terminal in some cases. In this case, the end portion of the insulating wire 130 is flatter than the part of the insulating wire 130 constituting the crossing part 140 in some cases. In this case, it is sufficient that the part of the insulating wire 130 constituting the crossing part 140 is flatter than an intermediate part other than the crossing part 140.

In the wiring member 110 in the above description, the part of the insulating wire 130 is flattened, however, it is also considered that the whole part of the insulating wire 130 is flatly formed. In this case, an insulating wire 130 flatly formed in advance such as a so-called rectangular wire can be adopted as the insulating wire 130. It is obvious that the whole insulating wire 130 may be flatly formed by crushing a whole round wire.

When the part of the insulating wire 130 is flattened, it is also applicable that a whole part of the insulating wire 130 disposed on the sheet material 20 is flatly formed, and there is a part which is not flat in a part not disposed on the sheet material 20. Accordingly, the thickness of the part of the wiring member 110 relating to the sheet material 20 can be reduced.

In the example described above, the insulating wire 30 is not overlapped on the upper wiring part 44, however, there may be a case where the insulating wire 30 is further overlapped on the upper wiring part 44. That is to say, in the example described above, the insulating wires 30 doubly cross in the crossing part 40, however, there may also be a case where the insulating wires 30 cross triply or more.

In the example described above, one insulating wire 30 constitutes the crossing part 40 in one position along the longitudinal direction, however, there may also be a case where one insulating wire 30 constitutes the crossing part 40 in a plurality of positions along the longitudinal direction. In this case, there may be a case where one insulating wire 30 constitutes the upper wiring part 44 in all of the crossing parts 40 or constitutes the lower wiring part 42 in all of the crossing parts 40. Furthermore, there may be a case where one insulating wire 30 constitutes the upper wiring part 44 in one crossing part 40 and constitutes the lower wiring part 42 in the other crossing part 40.

In the example described above, one upper wiring part 44 crosses over the plurality of lower wiring parts 42 in one crossing part 40. If the number of lower wiring parts 42 over which one upper wiring part 44 crosses increases or the thickness of the lower wiring part 42 increases in one crossing part 40, the second interval D2 between the first position P1 and the second position P2 increases. In this case, it is sufficient that the lower wiring parts 42 over which the upper wiring part 44 needs to cross are divided into a plurality of groups to form a plurality of crossing parts 40. That is to say, it is sufficient that one upper wiring part 44 is configured to cross over the lower wiring parts 42 in one group in one crossing part 40, and cross over the lower wiring parts 42 in the other group in the other crossing part 40. Accordingly, the number of lower wiring parts 42 over which the upper wiring part 44 needs to cross can be reduced in one crossing part 40, and the second interval D2 between the first position P1 and the second position P2 can be reduced in each crossing part 40. In this case, there may also be a case where a position of fixing the insulating wire 30 constituting the upper wiring part 44 and the sheet material 20 is located in one position between the adjacent crossing parts 40. This one position can be considered the first position P1 in relation to one of the adjacent crossing parts 40 and the second position P1 in relation to the other one of the adjacent crossing parts 40.

In the example described above, the upper wiring part 44 is disposed along a curved route in the crossing part 40, but may be disposed along a straight route. When there are the plurality of upper wiring parts 44 in one crossing part 40, there may be only one of the upper wiring part 44 disposed along the curved route and the upper wiring part 44 disposed along the straight route, or there may also be both types of upper wiring parts 44.

Similarly, the lower wiring part 42 is disposed along a curved route in the crossing part 40, but may be disposed along a straight route. When there are the plurality of lower wiring parts 42 in one crossing part 40, there may be only one of the lower wiring part 42 disposed along the curved route and the lower wiring part 42 disposed along the straight route, or there may also be both types of lower wiring parts 42.

In the example described above, all of the insulating wires 30 disposed on the sheet material 20 have the same diameter, however, the insulating wires 30 having different diameters may be provided and disposed together on the sheet material 20. For example, when a power line and a signal line are provided together, the power line tends to have current relatively larger than the signal line, thus it is considered that an insulating wire having a larger diameter is used as the power line and an insulating wire having a small diameter is used as the signal line.

When the insulating wires 30 having different diameters are provided and disposed together on the sheet material 20 and when the crossing part 40 is formed on the sheet material 20, any of the insulating wire having the large diameter and the insulating wire having the small diameter may be adopted as the insulating wire 30 constituting the crossing part 40. However, at least one of the insulating wires 30 constituting the crossing part 40 is preferably the insulating wire having the small diameter, and all of the insulating wires 30 constituting the crossing part 40 are more preferably the insulating wires each having the small diameter. When the insulating wire 30 constituting the crossing part 40 is the insulating wire having the small diameter, the increase in the height of the crossing part 40 can be suppressed.

When the insulating wire 30a constituting the lower wiring part 42 and the insulating wire 30b constituting the upper wiring part 44 are made up of a combination of the insulating wire having the large diameter and the insulating wire having the small diameter, the insulating wire having the large diameter may be the upper wiring part 44, and the insulating wire having the small diameter may be the upper wiring part 44.

When the plurality of upper wiring parts 44 cross over one lower wiring part 42 in one crossing part 40 and when the plurality of upper wiring parts 44 are made up of a combination of the insulating wire having the large diameter and the insulating wire having the small diameter, it is sufficient that the part of the insulating covering 34 of the lower wiring part 42 overlapped with the insulating wire having the large diameter is welded.

In the example described above, both the insulating wire 30a constituting the lower wiring part 42 and the insulating wire 30b constituting the upper wiring part 44 in the crossing part 40 have end portions, at least one of which is connected to a different terminal part, respectively, however, this configuration is not necessary. There may also be a case where each end portion of both wiring parts are connected to the same terminal part. More specifically, in the example described above, when one end portion of the insulating wire 30a constituting the lower wiring part 42 is housed in a first connector and the other end portion is housed in a second connector, at least one end portion of the insulating wire 30b constituting the upper wiring part 44 is housed in a third connector different from the first connector and the second connector. In contrast, when one end portion of the insulating wire 30a constituting the lower wiring part 42 is housed in the first connector and the other end portion is housed in the second connector, there may be a case where one end portion of the insulating wire 30b constituting the upper wiring part 44 is also housed in the first connector and the other end portion is also housed in the second connector.

In the example described above, the lower wiring part 42 and the upper wiring part 44 in the crossing part 40 are not fixed to each other, however, there may also a case where they are fixed to each other.

In the example described above, the insulating wire 30 is disposed on only one main surface of the sheet material 20, however, the insulating wire 30 may also be disposed on both main surfaces of the sheet material 20. In this case, one insulating wire 30 may also be disposed on both main surfaces of the sheet material 20. The insulating wire 30 may pass through an outer side of an edge portion of the sheet material 20 to lead from one main surface to the other main surface, or may pass through a concave portion or a through hole formed in the sheet material 20 to lead from one main surface to the other main surface, for example.

In addition to the sheet material 20, a protection material may be attached to the wiring member 10. The protection material is not particularly limited, however, an adhesive tape, a corrugate tube, or a protection sheet, for example, can be adopted.

In addition to the sheet material 20, an acoustic insulation material may be attached to the wiring member 10. The acoustic insulation material is provided to prevent abnormal noise occurring when the wiring member 10 has contact with the other member, for example. The acoustic insulation material is not particularly limited, however, an adhesive tape including a foam resin as a base material such as an urethan tape, for example, can be used. For example, urethan foam may be directly blown onto the wiring member 10 to form the acoustic insulation material.

In attaching the protection material and the acoustic insulation material described above, the wiring member 10 may remain flat or may be rolled up. The protection material and the acoustic insulation material described above may be provided on the wire arrangement surface, a surface on a side opposite from the wire arrangement surface, or both the surfaces.

Each configuration described in the embodiment and each modification example can be appropriately combined as long as they are not contradictory.

EXPLANATION OF REFERENCE SIGNS 10, 110 wiring member
20 sheet material
30, 30a, 30b, 130 insulating wire
32 core wire
34 insulating covering
40, 140 crossing part
42, 42a, 42b, 142 lower wiring part
44, 144 upper wiring part
D1 first interval
D2 second interval
D3 third interval
D4 fourth interval
P fixing position
P1 first position
P2 second position
P3 position of crossing part

The invention claimed is:
1. A wiring member, comprising:
a sheet material; and
a plurality of insulating wires disposed to have a crossing part on a main surface of the sheet material, wherein
an insulating wire in the plurality of insulating wires constituting at least one lower wiring part in the cross- ing part is fixed to the sheet material in a plurality of positions at intervals in a longitudinal direction, and an insulating covering of the lower wiring part is fixed to the sheet material in a position of the crossing part, and a thickness of at least one of the insulating covering of the lower wiring part and the sheet material in the position is reduced.

2. The wiring member according to claim 1, wherein the insulating wire constituting an upper wiring part in the crossing part is fixed to the sheet material in a first position and a second position sandwiching the crossing part.

3. The wiring member according to claim 2, wherein an interval between the first position and the second position is equal to or smaller than 30 millimeters.

4. The wiring member according to claim 3, wherein the interval between the first position and the second position is equal to or smaller than 20 millimeters.

5. The wiring member according to claim 2, wherein each of intervals between the first position and the crossing part and between the second position and the crossing part is equal to or larger than a minimum bending radius of the insulating wire constituting the upper wiring part.

6. The wiring member according to claim 2, wherein the insulating wire constituting the upper wiring part is fixed to the sheet material also in a position other than the first position and the second position with an interval different from an interval between the first position and the second position along a longitudinal direction.

7. The wiring member according to claim 6, wherein the insulating wire fixed to the sheet material in the first position and the second position includes a part fixed to the sheet material with an interval larger than the interval between the first position and the second position.

8. The wiring member according to claim 1, wherein a part of the insulating wire constituting the crossing part is flat.

9. The wiring member according to claim 8, wherein a part of the insulating wire other than the crossing part includes a part not flatter than the part constituting the crossing part.

10. The wiring member according to claim 9, wherein when the insulating wire is seen along a circumferential direction, in the part constituting the crossing part, both a part facing the other insulating wire with which the insulating wire crosses and a part on a side opposite from the other insulating wire are crushed to be flatter than the part which is not flatter.

11. The wiring member according to claim 8, wherein one insulating wire crosses with two or more insulating wires in the crossing part, and parts of the one insulating wire crossing with the two or more insulating wires along a longitudinal direction and part located between the two or more insulating wires are flat.

12. The wiring member according to claim 2, wherein the plurality of lower wiring parts are located between one set of the first position and the second position.

13. The wiring member according to claim 1, wherein a first insulating wire and a second insulating wire having a smaller diameter than the first insulating wire are provided together on the sheet material, and at least one of an upper wiring part and a lower wiring part constitutes the second insulating wire in all crossing parts on the sheet material.

\* \* \* \* \*